United States Patent
Barnette et al.

(10) Patent No.: US 9,367,110 B2
(45) Date of Patent: Jun. 14, 2016

(54) ENERGY LOCKOUT IN RESPONSE TO A PLANAR CATASTROPHIC FAULT

(71) Applicant: International Business Machines Corporation, Armonk, NY (US)

(72) Inventors: Jamaica L. Barnette, Durham, NC (US); Raymond M. Clemo, Raleigh, NC (US); Douglas I. Evans, Cary, NC (US); Brian C. Totten, Durham, NC (US)

(73) Assignee: Lenovo Enterprise Solutions (Singapore) Pte. Ltd., Singapore (SG)

(*) Notice: Subject to any disclaimer, the term of this patent is extended or adjusted under 35 U.S.C. 154(b) by 154 days.

(21) Appl. No.: 14/278,520

(22) Filed: May 15, 2014

(65) Prior Publication Data

US 2015/0333511 A1 Nov. 19, 2015

(51) Int. Cl.
- H02H 11/00 (2006.01)
- H02H 7/20 (2006.01)
- H02H 3/08 (2006.01)
- G06F 1/26 (2006.01)

(52) U.S. Cl.
CPC .. *G06F 1/26* (2013.01); *H02H 3/08* (2013.01); *H02H 7/20* (2013.01); *H02H 11/00* (2013.01)

(58) Field of Classification Search
CPC ............ H02H 3/08; H02H 7/20; H02H 11/00
USPC .......................................................... 361/104
See application file for complete search history.

(56) References Cited

U.S. PATENT DOCUMENTS

| | | | |
|---|---|---|---|
| 4,084,146 A * | 4/1978 | Baumann | H01H 85/046 337/234 |
| 4,587,588 A | 5/1986 | Goldstein | |
| 5,568,350 A | 10/1996 | Brown | |
| 7,385,797 B1 | 6/2008 | Garnett | |
| 7,690,843 B2 | 4/2010 | Bowden et al. | |
| 8,335,065 B2 | 12/2012 | Smith | |
| 2005/0068085 A1 * | 3/2005 | Nalbant | H02M 1/36 327/337 |
| 2006/0120000 A1 * | 6/2006 | Fiesoli | H02H 3/025 361/93.1 |
| 2006/0202232 A1 * | 9/2006 | Takami | G11C 7/24 257/209 |
| 2009/0207543 A1 | 8/2009 | Boniface et al. | |
| 2012/0274279 A1 | 11/2012 | Banos et al. | |

FOREIGN PATENT DOCUMENTS

EP 2288236 A2 2/2011

* cited by examiner

*Primary Examiner* — Thienvu Tran
*Assistant Examiner* — Kevin J Comber
(74) *Attorney, Agent, or Firm* — Katherine S. Brown; Jeffrey L. Streets

(57) ABSTRACT

A computer planar includes an enable signal line for providing an enable signal to an external power supply, wherein the external power supply will not turn on unless the enable signal is active high. During normal operation, an auxiliary power source maintains an active high enable signal on the enable signal line, which includes a fuse. However, a fault protection circuit coupled to the enable signal line can pull down the enable signal line in response to a fault, such that the fuse is permanently opened. Once the fuse is open, the external power supply cannot be enabled and further damage to the computer planar is prevented.

14 Claims, 2 Drawing Sheets

ENERGY LOCKOUT IN RESPONSE TO A PLANAR CATASTROPHIC FAULT

BACKGROUND

1. Field of the Invention

The present invention relates to systems and method of reducing damage to a planar following a device fault.

2. Background of the Related Art

Server planar designs often contain circuitry that, in the event of a catastrophic device fault, continues to allow current flow into the fault such that the planar experiences subsequent exothermic damage. However, at the time of the initial catastrophic fault, the planar or system may be able to detect the presence of the fault and its severity. In response to detecting the fault, the system can quickly remove energy that is externally applied to the planar and thus prevent severe exothermic damage to the planar at the time of the original fault.

However, once energy has been removed from the planar, the operator is allowed to power the system back on sometime after the original catastrophic fault. Unfortunately, the fault detection circuitry may have been damaged due to the previous fault or slowed down by the system startup. In either case, there is the potential for additional exothermic damage to the faulty system.

BRIEF SUMMARY

One embodiment of the present invention provides a computer planar comprising an enable signal line for providing an enable signal to an external power supply, wherein the external power supply will not turn on unless the enable signal is active high. The computer planar further comprises an auxiliary power source for maintaining an active high enable signal on the enable signal line, a fuse coupled between the auxiliary power source and the enable signal line, and one or more fault protection circuits coupled to the enable signal line, wherein each fault protection circuit can pull down the enable signal line and open the fuse in response to a fault.

Another embodiment of the present invention provides a method comprising providing an active high enable signal on an enable signal line to an external power supply during normal operation of a computer planar, wherein the enable signal line includes a fuse coupling the enable signal line to an auxiliary power source, and pulling down the enable signal line in response to detecting a fault, wherein pulling down the enable signal line causes the fuse to open, and wherein opening the fuse prevents enabling of the external power supply.

DETAILED DESCRIPTION

Figure 1:
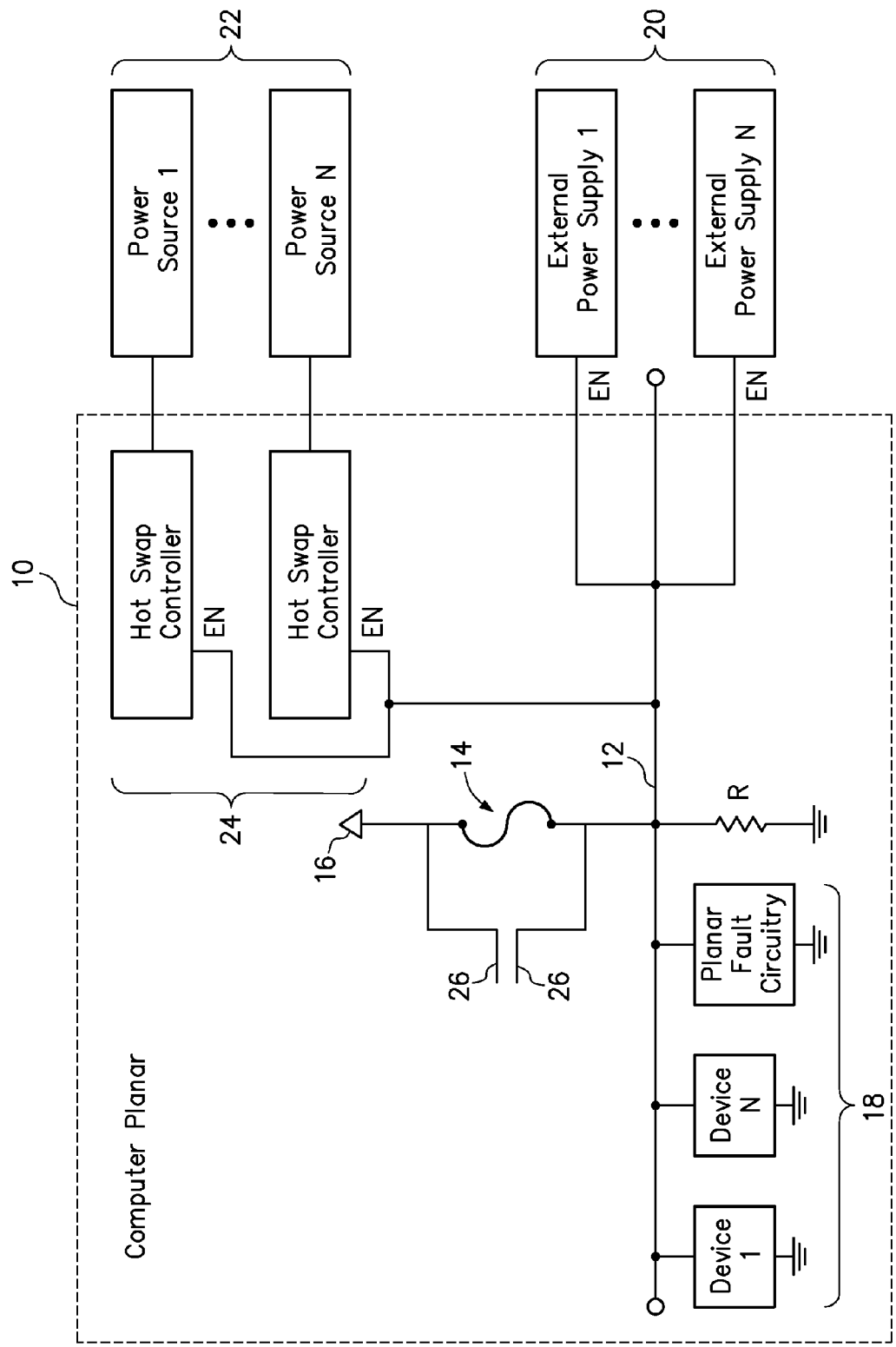
FIG. 1 is a diagram of a computer planar including an enable signal line with a catastrophic fault latch that prevents enabling of an external power supply.

One embodiment of the present invention provides a computer planar comprising an enable signal line for providing an enable signal to an external power supply, wherein the external power supply will not turn on unless the enable signal is active high. The computer planar further comprises an auxiliary power source for maintaining an active high enable signal on the enable signal line, a fuse coupled between the auxiliary power source and the enable signal line, and one or more fault protection circuits coupled to the enable signal line, wherein each fault protection circuit can pull down the enable signal line and open the fuse in response to a fault.

The computer planar is a printed circuit board, such as a motherboard supporting the installation and operation of a processor, memory and other components of a computer. Optionally, the computer planar is a server planar.

The computer planar may, for example, include a hot swap controller for selectively coupling to a hot swap device that distributes power. Such a hot swap controller may have an enable input coupled to the enable signal line. Accordingly, the hot swap controller will not enable the hot swap device unless the enable signal is active high.

The fuse is coupled between the auxiliary power source and the enable signal line, and is preferably a pull-up fuse. Under normal operation, the auxiliary power source drives the active high signal on the enable signal line without damaging the fuse due the low level of current through the fuse. However, when the enable signal line is pulled down, the current through the fuse increases and causes the fuse to open. For example, a fuse may include a metal wire or strip that, under high amounts of current, will melt and thereby permanently interrupt the current through the fuse. The sacrificial fuse must be replaced in order to restore the current path from the auxiliary power source to the enable signal line, and enable the enable signal line to once again provide an active high signal.

The one or more fault protection circuits may include a sensing or reporting device. Non-limiting examples of such devices include a voltage regulator capable of detecting a shorted power FET, system circuitry that detects a failed FET, or a FPGA or ASIC capable of detecting a catastrophic fault. Optionally, each fault protection circuit may pull down the enable signal line with an open drain.

In one option, a pair of junctions may be provided in the enable signal line on either side of the fuse. The pair of junctions are configured for receiving a jumper around the fuse, wherein manual installation of the jumper serves to override the fuse after it has been opened. This may be beneficial to allow an operator to get power restored to the computer planar after the risk of damage has been addressed.

In a further option, the computer planar may further include a second enable signal line for providing a second enable signal to a second external power supply or second hot swap controller. Both the second external power supply and second hot swap controller will not turn on unless the enable signal is active high. A second auxiliary power source is provided for maintaining an active high enable signal on the second enable signal line, and a second fuse is coupled between the second auxiliary power source and the second enable signal line. One or more second fault protection circuits are coupled to the second enable signal line, wherein each second fault protection circuit can pull down the second enable signal line and open the second fuse in response to a fault. Opening the second fuse prevents the second enable signal line from being active high but does not prevent the first enable signal line from being active high. Still further, any number of planars, boards, subcomponents and/or external power sources could be included in a specific configuration.

In embodiments with first and second enable signal lines, those enable signal lines may operate in the same manner, but will provide the enable signal to different power supplies or different hot swap controllers. Furthermore, the first and second enable signal lines may have different fault protection circuits or devices that can pull down the respective enable signal lines to open the respective fuse. Accordingly, each enable signal line may be selectively disabled according to a particular fault, so that the particular fault does not necessarily shut down the entire computer planar. In one configuration, the first auxiliary power source and second auxiliary power source are the same power source supplying power to both of the first and second enable signal lines. It should be recognized that the computer planar may implement any number of enable signal lines.

Another embodiment of the present invention provides a method comprising providing an active high enable signal on an enable signal line to an external power supply during normal operation of a computer planar, wherein the enable signal line includes a fuse coupling the enable signal line to an auxiliary power source, and pulling down the enable signal line in response to detecting a fault, wherein pulling down the enable signal line causes the fuse to open, and wherein opening the fuse prevents enabling of the external power supply.

With respect to the method, the enable signal line may be pulled down by one or more fault protection circuits coupled to the enable signal line in response to the one or more fault protection circuits detecting the fault. In one option, the one or more fault protection circuits may include a sensing or reporting device. In another option, the one or more fault protection circuits can pull down the enable signal line with an open drain. The method may also provide the active high enable signal to a hot swap controller coupled to a hot swap device that distributes power, wherein opening the fuse prevents the hot swap controller from enabling the hot swap device.

Embodiments of the present invention provide a way for the computer planar to respond to a catastrophic fault by permanently disabling an enable line to the external power source(s) and/or disable hot swap devices which distribute the power. This prevents an operator from powering on the faulted computer planar, and eliminates the possibility of additional exothermic damage to the computer planar. More specifically, no external power source is allowed to turn on if connected to the failed planar. Disabling the enable line will preferably also prevent any hot swap device from distributing power to the fault. Furthermore, external power supplies or sources and hot swap devices do not need to turn on and detect the fault again or wait for a new catastrophic fault assertion from the planar or system. Catastrophic fault detection circuitry often cannot be relied upon to detect a fault more than once any way. With the external power source(s) or hot swap device(s) prevented from turning on, there is no possibility of additional planar exothermic damage.

FIG. 1 is a diagram of a computer planar 10 including an enable signal line 12 with a catastrophic fault latch, in the form of a fuse 14, that prevents enabling of external power supplies 20 and hot swap power sources 22 after a catastrophic fault. An auxiliary power source 16 provides an active high enable signal on the enable signal line 12 so long as the fuse 14, which is coupled between the auxiliary power source 16 and the enable signal line 12, remains closed (provides a conductive current path). Accordingly, an active high enable signal may be communicated to the device enable inputs (EN) of external power supplies 20 and the hot swap controllers 24 that control the hot swap power sources 22.

Various fault protection circuits or devices 18 are coupled to the enable signal line 12 and have the capability of pulling down the voltage on the enable signal line 12 in response to a fault such that the fuse 14 will permanently open (no conductive current path). In this manner, an active high enable signal is provided on the enable signal line 12 unless and until there is a fault. After the fault, the open fuse prevents the external power supplies 20 and hot swap devices 22 from being enabled. Since the external power supplies 20 and hot swap devices 22 cannot be turned on, the computer planar 10 is protected from further damage.

As shown, the computer planar 10 may include a pair of junctions 26 in the enable signal line 12 on either side of the fuse 14. Should the fuse open, the pair of junctions 26 are configured for receiving a jumper (not shown) there between to provide a conductive path around the fuse. Manual installation of a jumper serves to override the fuse, after it has been opened, when an operator has determined that the risk of further damage to the computer planar 10 has been eliminated. Most preferably, an open fuse would be replaced after the component responsible for the catastrophic fault has been fixed.

Figure 2:
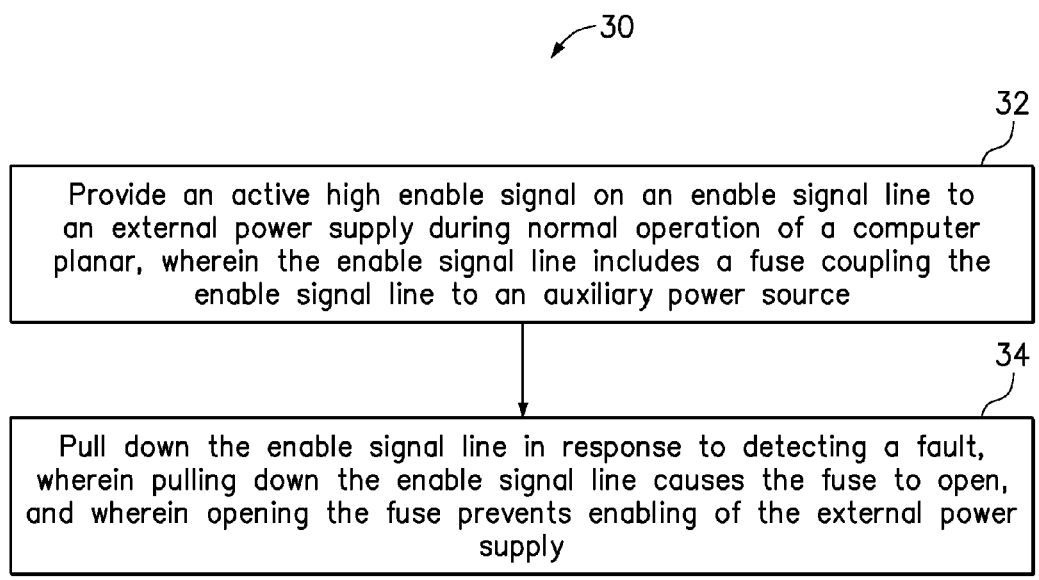
FIG. 2 is a flowchart of a method according to one embodiment of the present invention.

FIG. 2 is a flowchart of a method 30 according to one embodiment of the present invention. In step 32, the method provides an active high enable signal on an enable signal line to an external power supply during normal operation of a computer planar, wherein the enable signal line includes a fuse coupling the enable signal line to an auxiliary power source. In step 34, the enable signal line is pulled down in response to detecting a fault, wherein pulling down the enable signal line causes the fuse to open, and wherein opening the fuse prevents enabling of the external power supply.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer planar, comprising:
   an enable signal line for providing an enable signal to an external power supply, wherein the external power supply will not turn on unless the enable signal is active high;
   an auxiliary power source for maintaining an active high enable signal on the enable signal line;
   a fuse coupled between the auxiliary power source and the enable signal line; and one or more fault protection circuits coupled to the enable signal line, wherein each fault protection circuit can pull down the enable signal line and open the fuse in response to a fault.

2. The computer planar of claim 1, further comprising:
a hot swap controller for selectively coupling to a hot swap device that distributes power, wherein the hot swap controller has an enable input coupled to the enable signal line, and wherein the hot swap controller will not enable the hot swap device unless the enable signal is active high.

3. The computer planar of claim 1, wherein the one or more fault protection circuits includes a sensing or reporting device.

4. The computer planar of claim 1, wherein the fuse is a pull-up fuse.

5. The computer planar of claim 1, wherein each fault protection circuit can pull down the enable signal line with an open drain.

6. The computer planar of claim 1, further comprising:
a pair of junctions in the enable signal line on either side of the fuse, wherein the pair of junctions are configured for receiving a jumper around the fuse, wherein manual installation of the jumper serves to override the fuse after it has been opened.

7. The computer planar of claim 1, further comprising:
a second enable signal line for providing a second enable signal to a second external power supply or second hot swap controller, wherein the second external power supply or second hot swap controller will not turn on unless the enable signal is active high;
a second auxiliary power source for maintaining an active high enable signal on the second enable signal line;
a second fuse coupled between the second auxiliary power source and the second enable signal line; and
one or more second fault protection circuits coupled to the second enable signal line, wherein each second fault protection circuit can pull down the second enable signal line and open the second fuse in response to a fault, wherein opening the second fuse prevents the second enable signal line from being active high but does not prevent the first enable signal line from being active high.

8. The computer planar of claim 7, wherein the first auxiliary power source and second auxiliary power source are the same power source.

9. A method comprising:
providing an active high enable signal on an enable signal line to an external power supply during normal operation of a computer planar, wherein the enable signal line includes a fuse coupling the enable signal line to an auxiliary power source;
pulling down the enable signal line in response to detecting a fault, wherein pulling down the enable signal line causes the fuse to open, and wherein opening the fuse prevents enabling of the external power supply.

10. The method of claim 9, wherein the enable signal line is pulled down by one or more fault protection circuits coupled to the enable signal line in response to the one or more fault protection circuits detecting the fault.

11. The method of claim 10, wherein the one or more fault protection circuits includes a sensing or reporting device.

12. The method of claim 10, wherein the one or more fault protection circuits can pull down the enable signal line with an open drain.

13. The method of claim 9, further comprising:
providing the active high enable signal to a hot swap controller coupled to a hot swap device that distributes power, wherein opening the fuse prevents the hot swap controller from enabling the hot swap device.

14. The method of claim 9, wherein the fuse is a pull-up fuse.

\* \* \* \* \*